(12) United States Patent
Browne et al.

(10) Patent No.: US 7,607,717 B2
(45) Date of Patent: Oct. 27, 2009

(54) REVERSIBLY DEPLOYABLE SPOILER

(75) Inventors: Alan L. Browne, Grosse Pointe, MI (US); Nancy L. Johnson, Northville, MI (US); Kevin B. Rober, Washington, MI (US); Mark A. Voss, Richmond, MI (US); Tadge J. Juechter, Troy, MI (US); Edward D. Moss, Commerce Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/533,883

(22) Filed: Sep. 21, 2006

(65) Prior Publication Data

US 2007/0063541 A1    Mar. 22, 2007

Related U.S. Application Data

(60) Provisional application No. 60/719,375, filed on Sep. 22, 2005.

(51) Int. Cl.
*B62D 35/00* (2006.01)
(52) U.S. Cl. .................................................. 296/180.1
(58) Field of Classification Search .... 296/180.1–180.5
See application file for complete search history.

(56) References Cited

U.S. PATENT DOCUMENTS 6,626,486 B2 * 9/2003 Lane ........................... 296/217
2006/0202508 A1 * 9/2006 Aase et al. ............... 296/180.1

FOREIGN PATENT DOCUMENTS

FR      2816905 A1 *   5/2002

OTHER PUBLICATIONS

Translation from European patent office site for FR2816905 A1.*

* cited by examiner

*Primary Examiner*—Dennis H Pedder
*Assistant Examiner*—Melissa A Black

(57) ABSTRACT

A reversibly deployable spoiler for a vehicle comprises a body and an active material in operative communication with the body. The active material, such as shape memory material, is operative to change at least one attribute in response to an activation signal. The active material can change its shape, dimensions and/or stiffness producing a change in at least one feature of the active spoiler airflow control device such as shape, dimension, location, orientation, and/or stiffness to control vehicle airflow and downforce to better suit changes in driving conditions such as speed, while reducing maintenance and the level of failure modes. An activation device, controller and sensors may be employed to further control the change in at least one feature of the active spoiler airflow control device such as shape, dimension, location, orientation, and/or stiffness. A method for controlling vehicle airflow selectively introduces an activation signal to initiate a change of at least one feature of the device that can be reversed upon discontinuation of the activation signal.

12 Claims, 9 Drawing Sheets

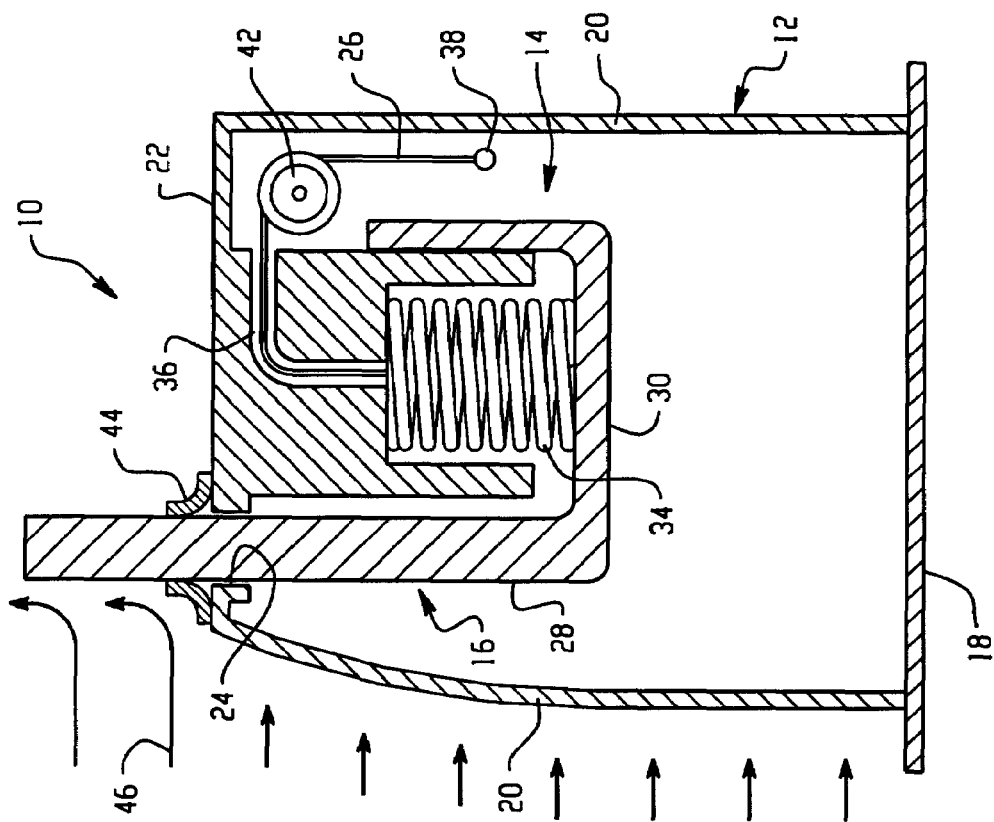
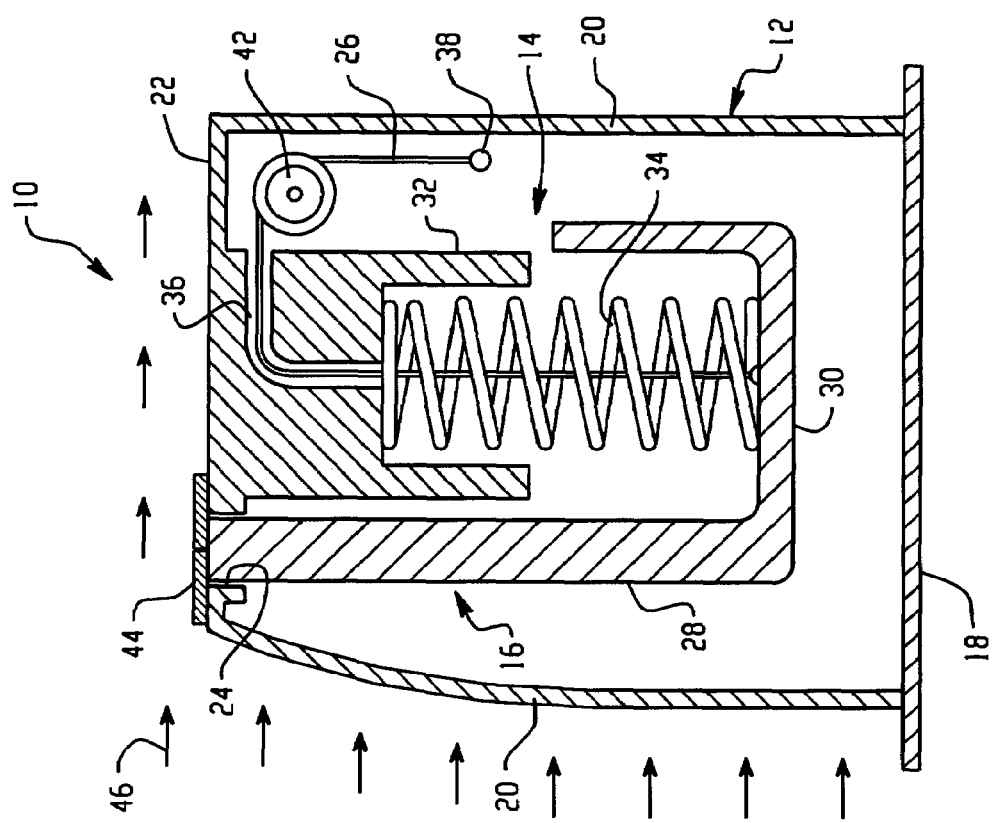
Fig. 2
Fig. 3

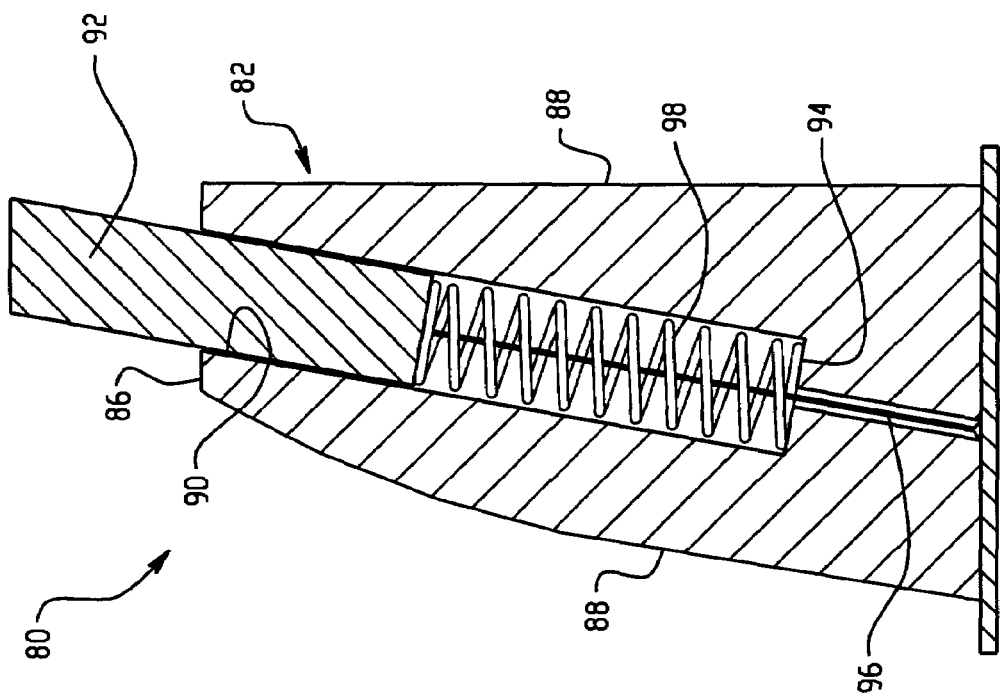
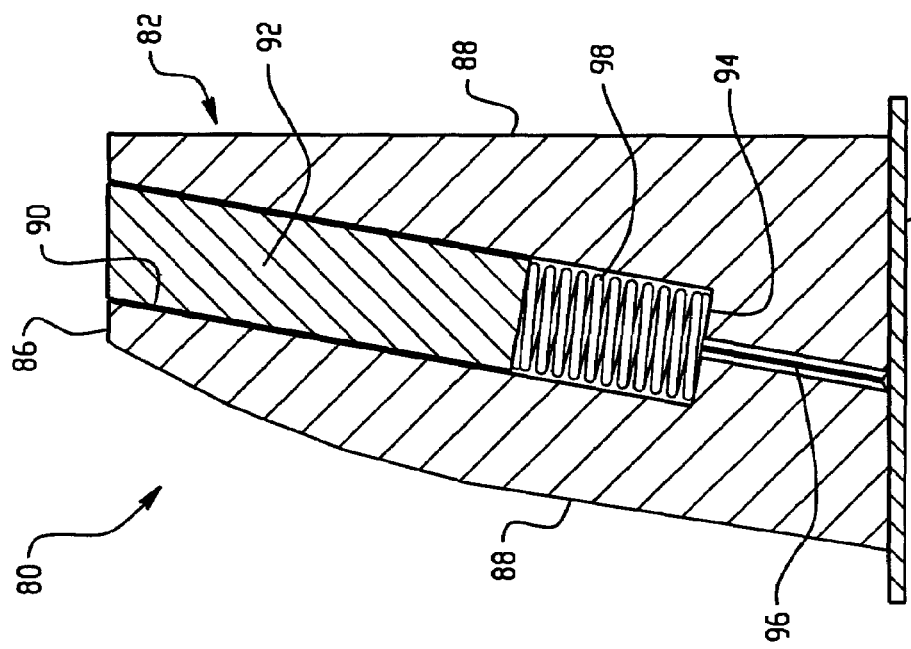

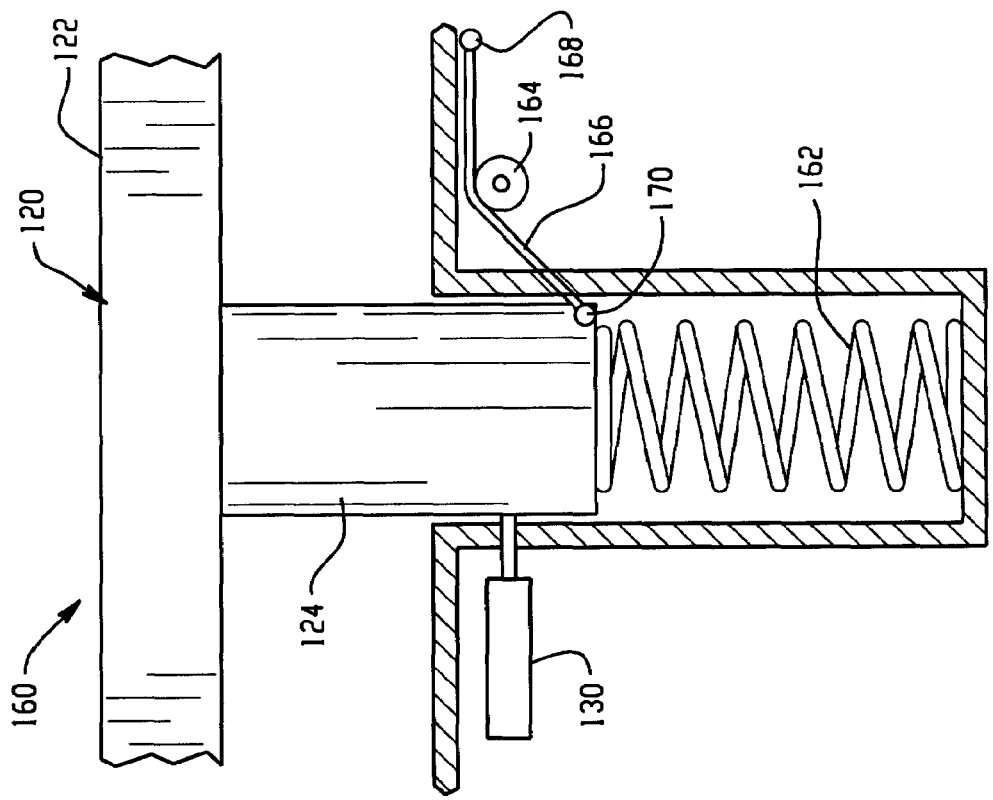
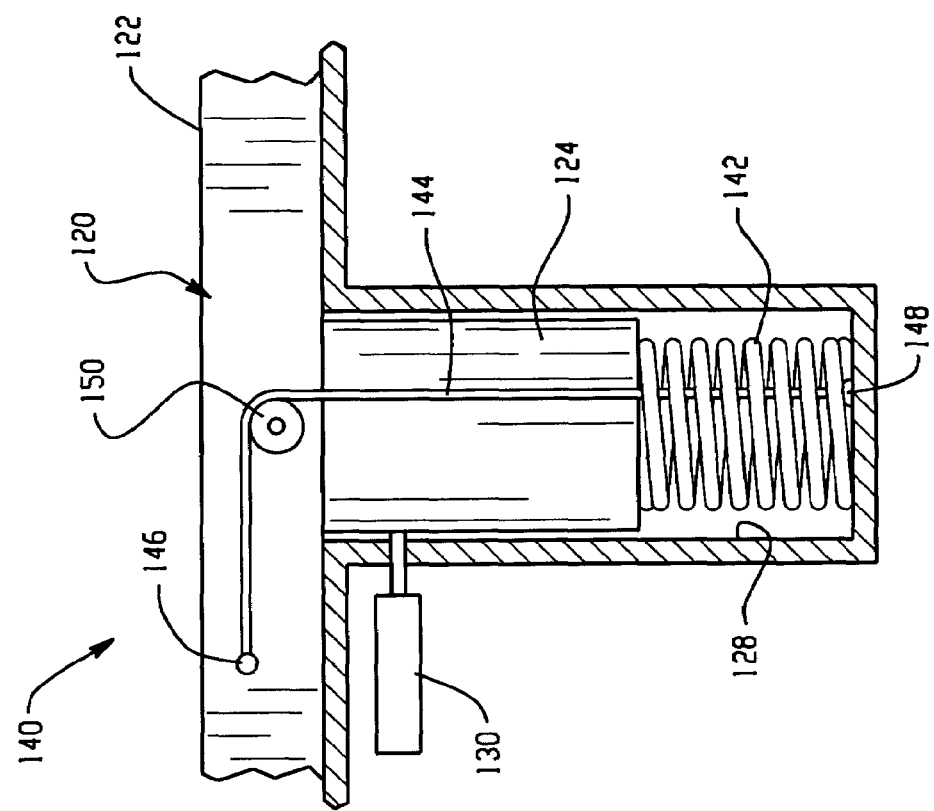
Fig. 13
Fig. 12

REVERSIBLY DEPLOYABLE SPOILER

CROSS REFERENCE TO RELATED APPLICATIONS

This application relates to and claims the benefit of priority to U.S. Provisional Patent Application No. 60/719,375 filed on Sep. 22, 2005, incorporated herein by reference in its entirety.

BACKGROUND

The present disclosure relates to airflow control devices for vehicles, and more particularly, to reversibly deployable vehicle spoilers that use active materials to effect deployment and retraction.

Airflow over, under, around, and/or through a vehicle can affect many aspects of vehicle performance including vehicle drag, vehicle lift and down force, and cooling/heat exchange for a vehicle powertrain and air conditioning systems. Reductions in vehicle drag improve fuel economy. Vehicle lift and downforce can affect vehicle stability and handling. As used herein, the term "airflow" refers to the motion of air around and through parts of a vehicle relative to either the exterior surface of the vehicle or surfaces of elements of the vehicle along which exterior airflow can be directed such as surfaces in the engine compartment. The term "drag" refers to the resistance caused by friction in a direction opposite that of the motion of the center of gravity for a moving body in a fluid. The term "lift" as used herein refers to the component of the total force due to airflow relative to a vehicle acting on the vehicle in a vertically upwards direction. The term "downforce" used herein refers to the component of total force due to airflow relative to the vehicle acting on a vehicle in a vertically downward direction.

Devices known in the art of vehicle manufacture to control airflow relative to a vehicle are generally of a predetermined, non-adjustable geometry, location, orientation and stiffness. Such devices generally do not adapt as driving conditions change, thus the airflow relative to the vehicle cannot be adjusted to better suit the changing driving conditions. Additionally, current under-vehicle airflow control devices can reduce ground clearance. Vehicle designers are faced with the challenge of controlling the airflow while maintaining sufficient ground clearance to avoid contact with and damage by parking ramps, parking blocks, potholes, curbs and the like. Further, inclement weather, such as deep snow slush or rainfall, can damage the device and/or impair vehicle handing.

There are many general types of airflow control devices used for vehicles. One of these is spoilers. FIG. 1 illustrates a vehicle 1 that includes a spoiler 5 in the location typically associated with its function as discussed below. A spoiler is designed to improve traction by increasing the downward force on the rear portion of a vehicle. The use of spoilers increases the cornering capability and improves stability at high speeds, but often at the expense of additional aerodynamic drag and weight. Without the presence of a spoiler, the area at the rear of the vehicle would experience more lift at higher speeds as a function of the flow aerodynamics.

Current spoilers are generally of a fixed geometry, location, orientation, and stiffness. Such devices can thus not be relocated, reoriented, reshaped, etc. as driving conditions change and thus airflow over/around the vehicle body can not be adjusted to better suit the changed driving condition. In those spoilers that are not of a fixed geometry, location, etc., the spoilers are typically made adjustable by mounting and/or connecting the devices to hydraulic, mechanical, electrical actuators and/or the like. For example, some vehicle spoilers may adjust location and/or orientation in response to an actuator signal. However, such actuators generally require additional components such as pistons, motors, solenoids and/or like mechanisms for activation, which increase the complexity of the device often resulting in increased failure modes, maintenance, and manufacturing costs.

Accordingly, it would be desirable to have a deployable spoiler that can be tuned according to the driving conditions and that enhances device simplicity while reducing device problems and the number of failure modes.

BRIEF SUMMARY

Reversibly deployable spoilers and methods are disclosed herein. In one embodiment, the spoiler defines a surface of the vehicle that can increase or decrease airflow down force during movement of the vehicle. The spoiler comprises a housing having an opening; an airflow control member translatably disposed within the housing and slidably engaged with the opening; and an active material actuator comprising an active material in operative communication with the airflow control member to effect deployment and retraction of the airflow control member from and into the housing.

In another embodiment, the spoiler comprises a housing comprising an airflow control member rotatably disposed within the housing, wherein rotation of the airflow control member increases or decreases airflow down force during movement of the vehicle; and an active material actuator in operative communication with the airflow control member to effect rotation of the airflow control member.

In yet another embodiment, a spoiler for a vehicle comprises a post translatable to a vehicle surface; an airflow control member mounted on the post; and an active material actuator comprising an active material in operative communication with the post to effect translation of the post relative to the vehicle surface.

In still another embodiment, the spoiler comprises a flexible surface positioned on the vehicle so as to affect airflow down force upon flexure thereof; a rotatable cam in contact with the flexible surface; and an active material actuator in operative communication with the airflow control member to effect rotation of the cam and cause flexure to the flexible surface.

The above described and other features are exemplified by the following figures and detailed description.

BRIEF DESCRIPTION OF THE DRAWINGS

Referring now to the figures, which are exemplary embodiments and wherein like elements are numbered alike:

FIG. 2 illustrates a sectional view of a reversibly deployable spoiler for a vehicle in a retracted position in accordance with one embodiment of the present disclosure;

FIG. 3 illustrates a sectional view of the reversibly deployable spoiler of FIG. 2 in a deployed position;

FIG. 6 illustrates a sectional view of a reversibly deployable spoiler for a vehicle in a retracted position in accordance with yet another embodiment of the present disclosure;

FIG. 7 illustrates a sectional view of the reversibly deployable spoiler of FIG. 6 in a deployed position;

FIG. 12 illustrates a suitable active material actuator for retracting the spoiler of FIG. 10; and FIG. 13 illustrates a suitable active material actuator for deploying the spoiler of FIG. 10.

DETAILED DESCRIPTION

Figure 1:
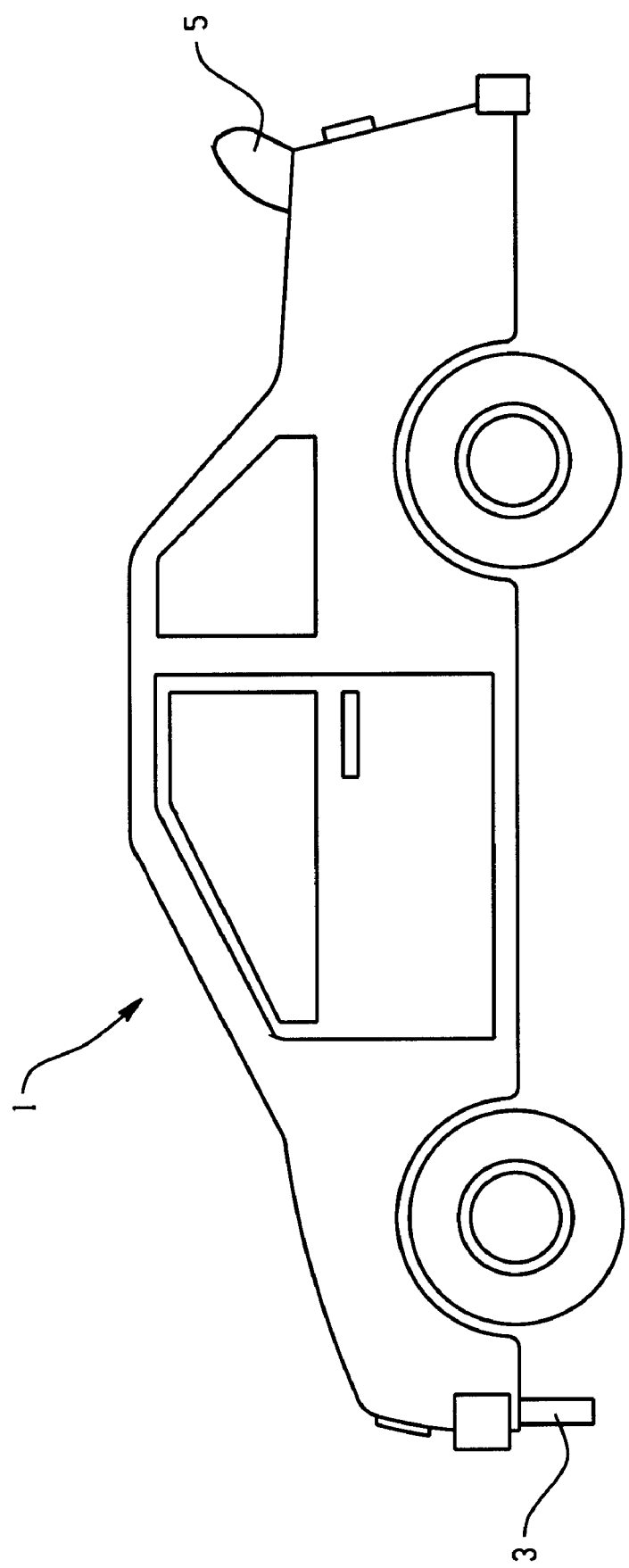
FIG. 1 illustrates a vehicle that includes a spoiler in a location typically associated with its function.

Active material actuated reversibly deployable airflow spoilers are disclosed herein. The airflow spoilers are suitable for use on vehicles on which it might be desirable to have on-demand greater downforce such as may be desired for vehicles utilized on occasion in competitive driving. It should be apparent that the airflow spoilers are mounted on a surface of the vehicle that can affect downforce to the vehicle during driving conditions. Typically, this position is at or about a rear deck of the vehicle although it is not intended to be limited to such location. Either deployment or stowing of the spoiler in these embodiments is in each case based on either a rigid body translation or rotation effected through just a single activation cycle (or at most a very small number of activation cycles) of an active material. Advantages associated with utilizing active materials to effect these changes include, among others, increased device simplicity, a reduced number of failure modes and thus increased device robustness, and reduced device volumes, masses, and energy requirements for activation because of their higher energy densities.

The classes of active materials included are those that exhibit a change in stiffness and/or dimensions in response to an actuation signal which can take various forms depending on the particular active material. Suitable active materials include, but are not limited to, shape memory alloys (SMA), shape memory polymers (SMP), electroactive polymers (EAP), ferromagnetic SMAs, electrorheological fluids (ER), magnetorheological fluids (MR), piezoelectric ceramics, various combinations of the foregoing materials, and the like such as is disclosed in pending U.S. patent application Ser. Nos. 10/983,330, 10/893,119, 10/872,327, and 10/983,329, all of which are incorporated by reference in their entireties.

The active material based spoiler devices for controlling vehicle airflow are generally directed to devices in which the active material (one or more) is connected externally either directly or remotely to a surface of an airflow control member causing either rigid body translation, rotation, or morphing of the airflow control device's airflow control surfaces.

In an embodiment shown in FIGS. 2 and 3, there is shown a spoiler generally designated by reference numeral 10 in the retracted and deployed positions, respectively. The spoiler 10 includes a housing 12 that contains an active material based actuator 14 and a deployable airflow member 16. The housing 12 has a bottom wall 18, sidewalls 20 extending from the bottom wall and a top wall 22. The housing 12 includes a slot opening 24 in the top wall 22 and is configured to permit retraction and deployment of the airflow control member 16 into and out of the housing 12. The active material 26 is in operative communication with the deployable airflow member to provide the retraction and deployment.

Using shape memory alloys as an exemplary active material, a shape memory alloy wire 26 is tethered at one end to a selected one of the walls or stationary anchor structure 38 within the housing 12 and at the other end is tethered to the second portion 30 of the airflow control member 16. As shown, the deployable airflow member 16 is generally "L" shaped having a first portion 28 slidably engaged with the slot opening 24 and a second portion 30 substantially perpendicular to the first portion. The housing 12 further includes a bias spring retaining structure 32 that is attached or integral to the top wall 22 to which the airflow control member 16 is slidably mounted. A bias spring 34 is disposed intermediate and in a biased relationship with the second portion of the airflow control member 16 and the bias spring retaining structure 32. The bias spring retaining structure 32 further includes a channel 36 for receiving the shape memory alloy wire 26, which has one end fixedly attached to an anchor structure 38 within the housing and the other end and fixedly attached to the second portion 30. The shape memory alloy wire 26 is disposed about one or more pulleys 42 and threaded through the channel 36 to provide vertical movement of the airflow control member 16. Activation of the shape memory alloy wire 26 causes a phase transformation, which results in contraction of the wire with a force sufficient to overcome those forces associated with the bias spring 34. The result is that the airflow control member 16 is slidably deployed from the slot opening 24. Deactivation causes the bias spring to psuedoplastically deform the shape memory alloy back to about its original position and length, which also results in retracting the airflow control member 16. In this manner, airflow as indicated by arrows 46 can be altered, which can be used to affect the downforce caused by the airflow on the vehicle. An optional flap seal 44 is disposed about the slot opening 24 to prevent particulate matter from entering the housing.

For this and other embodiments disclosed herein, the bias spring is generally chosen so that its axial stiffness (i.e., spring constant) is greater than that of the active material when the active material is not activated. For example, in the case of the shape memory alloy wire, the axial stiffness of the bias spring is chosen to be greater than that of the shape memory alloy wire when it is in its lower temperature martensite stiffness and is less than that of the wire when it is in its higher temperature austenite phase.

Figure 4:
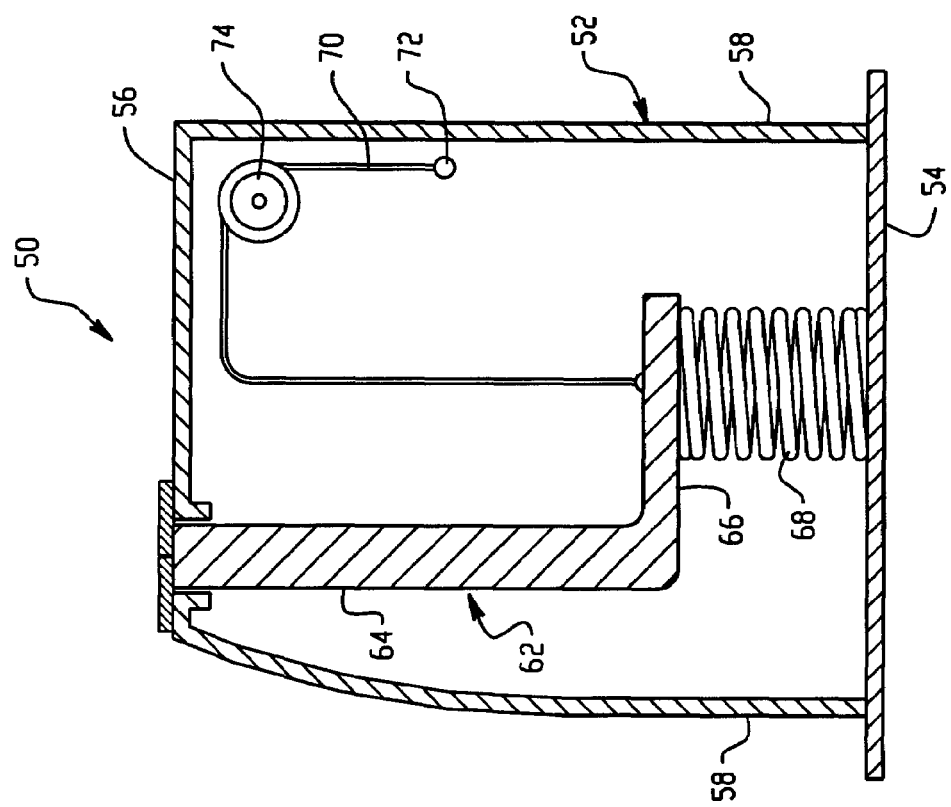
FIG. 4 illustrates a sectional view of a reversibly deployable spoiler for a vehicle in a deployed position in accordance with another embodiment of the present disclosure.
Figure 5:
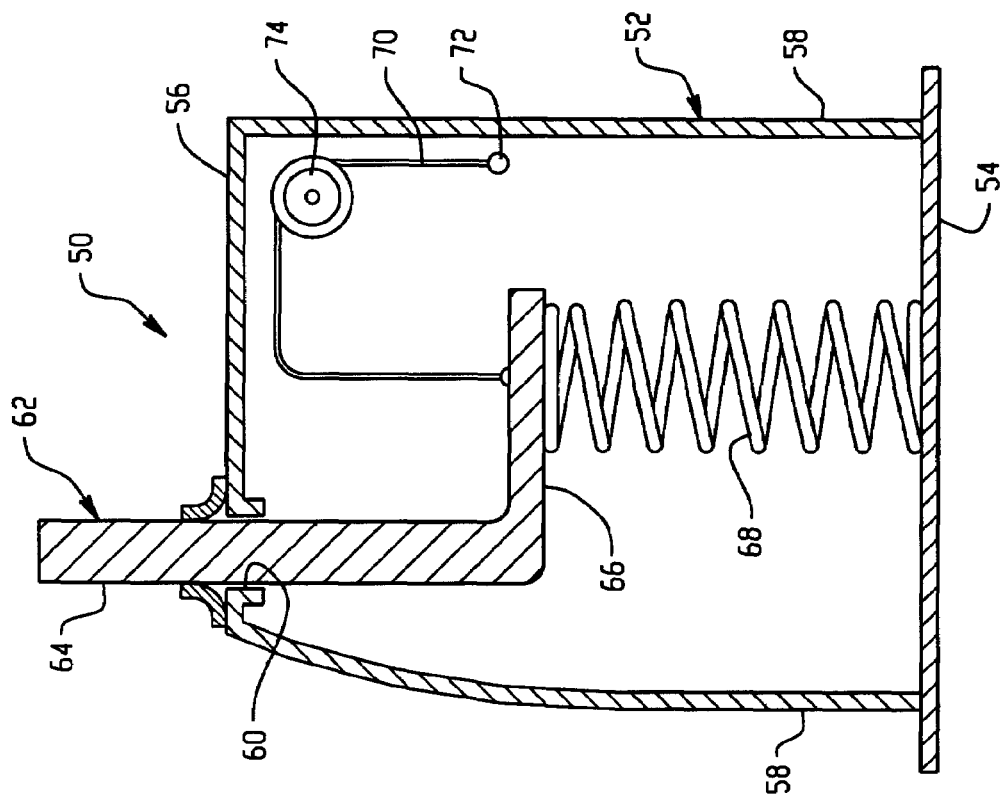
FIG. 5 illustrates a sectional view of the reversibly deployable spoiler of FIG. 4 in a retracted position.

In FIGS. 4 and 5, a spoiler 50 is shown in the deployed and retracted positions, respectively. The spoiler 50 includes a housing 52 having a bottom wall 54, a top wall 56, and sidewalls 58. The housing 52 further includes a slot opening 60 in which an airflow control member 62 is slidably engaged therewith. The airflow control member 62 is generally "L" shaped having a first portion 64 and a second portion 66 substantially perpendicular to the first portion. A bias spring 68 has one end fixed attached to the second portion 66 and the other end fixedly attached to the bottom wall 54. An active material 70, e.g., is tethered at one end to a selected one of the walls or stationary anchor structure 72 within the housing 62 and at the other end is tethered to the second portion 66 of the airflow control member 62. The shape memory alloy wire 70 is disposed about one or more pulleys 74 and configured to provide vertical movement of the airflow control member 62. Activation of the shape memory alloy wire 70 causes a phase transformation, which results in contraction of the wire with a force sufficient to overcome those forces associated with the bias spring 68.

In this embodiment, activation of the shape memory alloy wire 70 would cause simultaneous contraction of the shape memory alloy wire and expansion of the bias spring to deploy the airflow control member 62 as opposed to compressive process shown in previous embodiment discussed immediately above. Deactivation of the shape memory alloy wire would result in the bias spring pseudoplastically deforming the shape memory alloy wire to retract the airflow control member within the housing 62. A seal can be disposed about the slot opening.

In FIGS. 6 and 7, a spoiler 80 is shown in the retracted and deployed positions, respectively. The spoiler 80 includes a housing 82 having a bottom wall 84, a top wall 86, and sidewalls 88. The housing 52 further includes a slot opening 90 in which an airflow control member 92 is slidably engaged therewith. The slot opening 90 extends to the bottom wall and includes a shoulder 94 distally located from the top surface 86. The airflow control member 92 has a generally planar shape and is slidably engaged with the slot opening.

An active material 96, e.g., shape memory alloy wire, is tethered at one end to the airflow control member 92 and at the other end to the bottom wall 84 within the housing 82. The shape memory alloy wire 96 is configured to provide vertical movement of the airflow control member 82. A bias spring 98 is seated onto the shoulder 94 and is in contact with the airflow control member 92. The bias spring 98 is dimensioned such that in the absence of an activation signal to the shape memory alloy wire, the bias spring positions the airflow control member 82 into the air flow path, i.e., causes deployment of the airflow control member from the housing. Upon activation of the shape memory alloy wire, the wire contracts causing the bias spring to compress, thereby retracting the airflow control member 82. As such, the length of the slot opening to the shoulder of the recess is about equal or less than the length of the airflow deployable member 92 and the length of the bias spring upon compression by the shape memory alloy wire.

Figure 8:
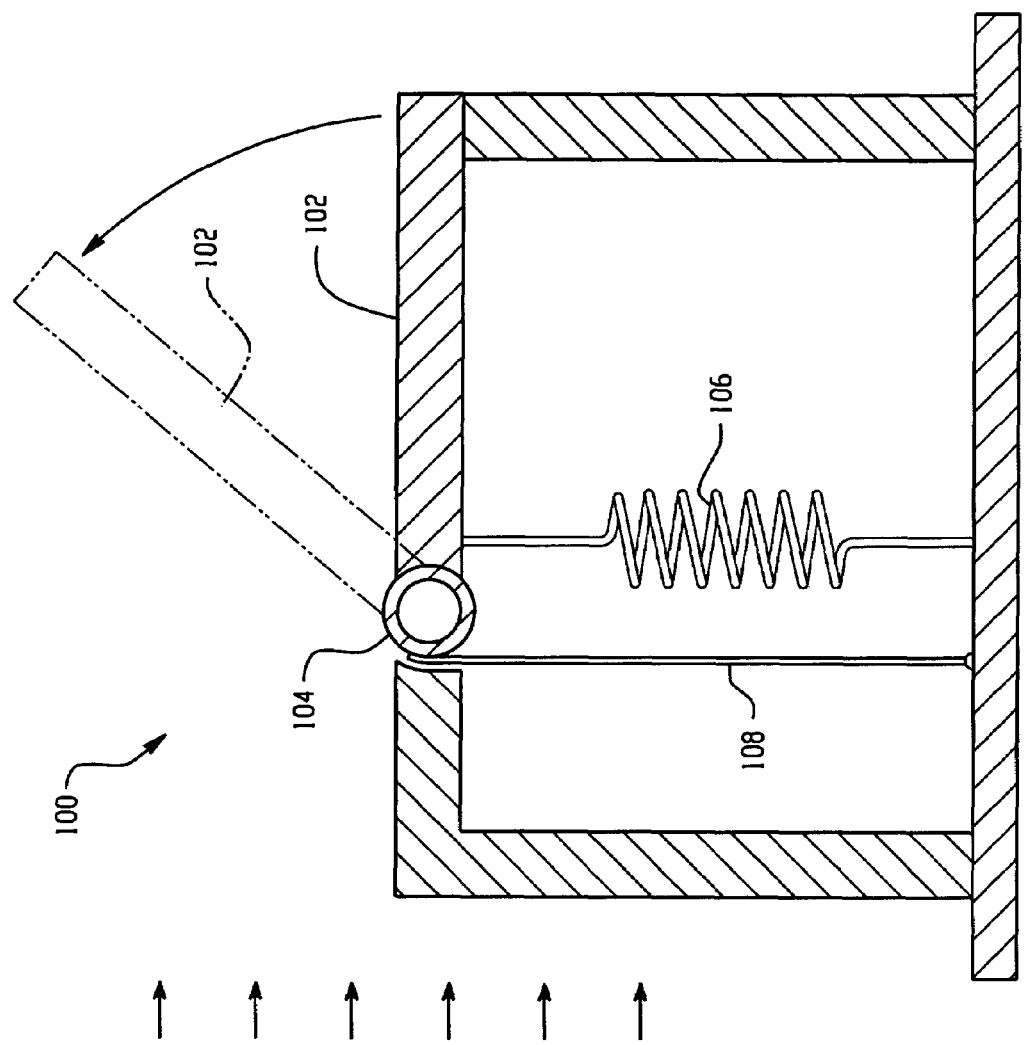
FIG. 8 illustrates a sectional view of a reversibly deployable spoiler that employs a rotary mechanism in accordance with another embodiment.

In another embodiment shown in FIG. 8, a spoiler 100 is depicted in which the active material (one or more) is connected externally either directly or remotely to the airflow control member 102. In this example, the airflow control surface 102 is attached to a axle 104, which is free to rotate about its axis. A spring 106 and an SMA wire 108 are attached to the hollow tube 104 in an opposing fashion such that their tensions balance each other and rotation of the tube through external means will increase the tension in one while reducing tension in the other. At low vehicle speeds, tension in the spring 106 combined with reduced stiffness and greater length in the SMA wire 108 keeps the spoiler rotated flush to the vehicle surface and out of the way. At high vehicle speeds, the temperature of the SMA wire is raised, e.g., through resistance heating, to produce a phase change from martensite to austenite in the SMA wire. This results in typically a four percent reduction in its length and a significant increase in its stiffness. This combined change in length and stiffness results in a rotation—deployment—of the airflow control device and a stretching of the counterbalancing spring 106. Upon shutting off the current that is causing resistance heating of the SMA wire, the wire cools to its martensite phase and the stretched spring returns the airflow control device to its stowed position.

Although reference has been made specifically to the use of shape memory alloys, it is to be noted that an EAP could also be used in place of SMA as the actuator in these embodiments in order to achieve the desired linear or rotary deployment. Especially in the case of deployment by translation, packaging becomes much less an issue with EAP, as variously in tendon, sheet, or slab form, EAP can be made to experience 100% strain when subjected to an applied voltage.

Figure 9:
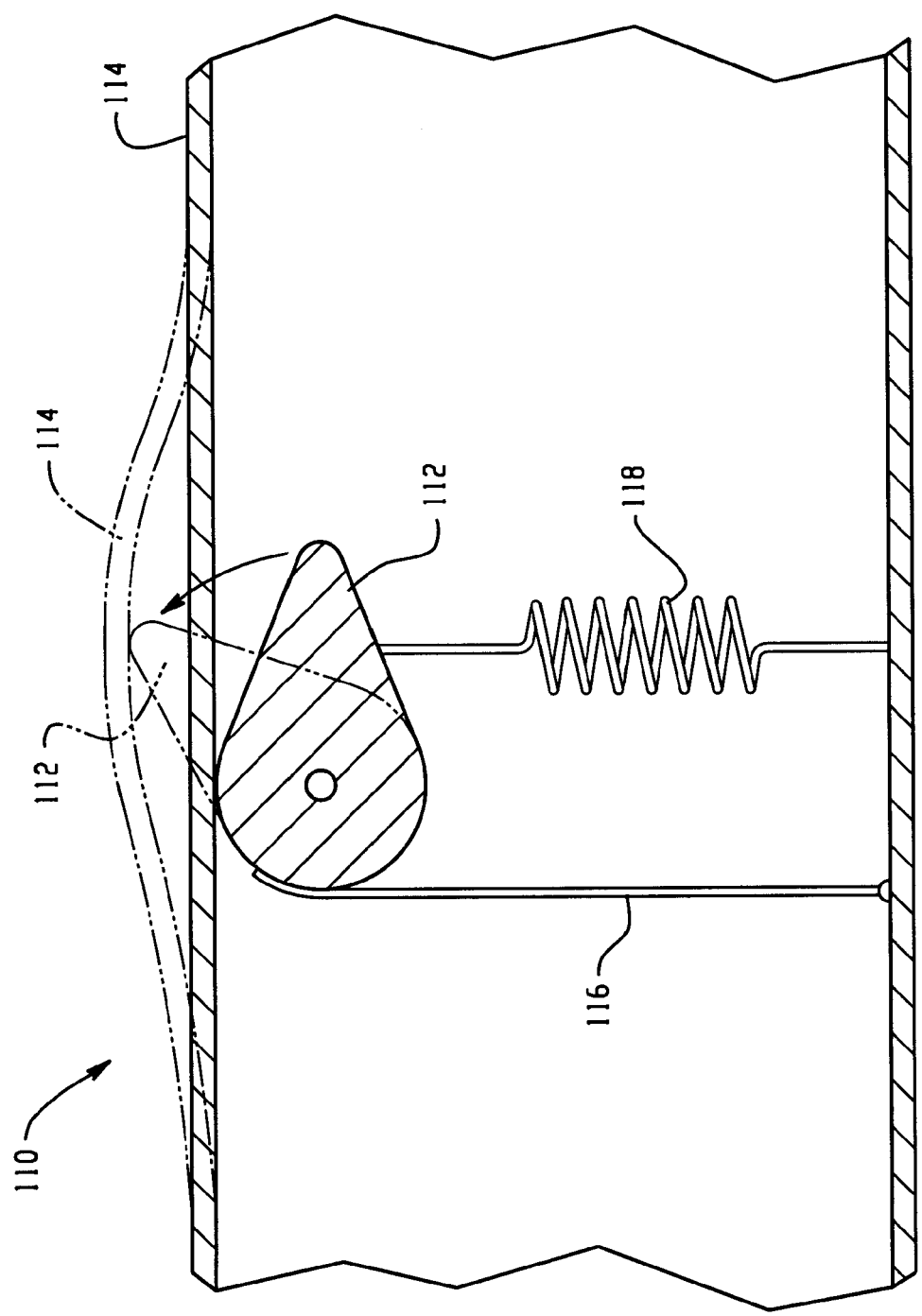
FIG. 9 illustrates a sectional view of a reversibly deployable spoiler that employs a rotary mechanism in accordance with yet another embodiment.

Embodiments are also envisioned, as indicated, in which the externally attached active material is used to morph the airflow control surface(s) of the spoiler. As shown in FIG. 9, the spoiler 110 includes a cam-like device that is located adjacent to a flexible surface of an airflow control member 114. Activation of an active material 116 physically linked to the cam 112, such as an SMA wire or spring or an EAP sheet or tendon will cause rotation of the cam, which rotation elastically deforms the flexible airflow control surface of the airflow control device. A bias spring 118, which could take various forms, or the energy stored elastically in the deformed surface could be used to return the surface of the airflow control device to its original configuration once the activation signal is removed.

In an alternative embodiment, the airflow control devices can be configured with latching mechanisms, involving either active materials directly (such as holding in position through the field activated change in shear strength in ER and MR fluids), or that are active material actuated or otherwise, that hold the deployable airflow control device in either the deployed or stowed positions thus allowing either power on or power off position/shape hold, i.e., in power off approaches power for actuation is then only needed in these embodiments during deploying or stowing of the active airflow control device.

Figure 10:
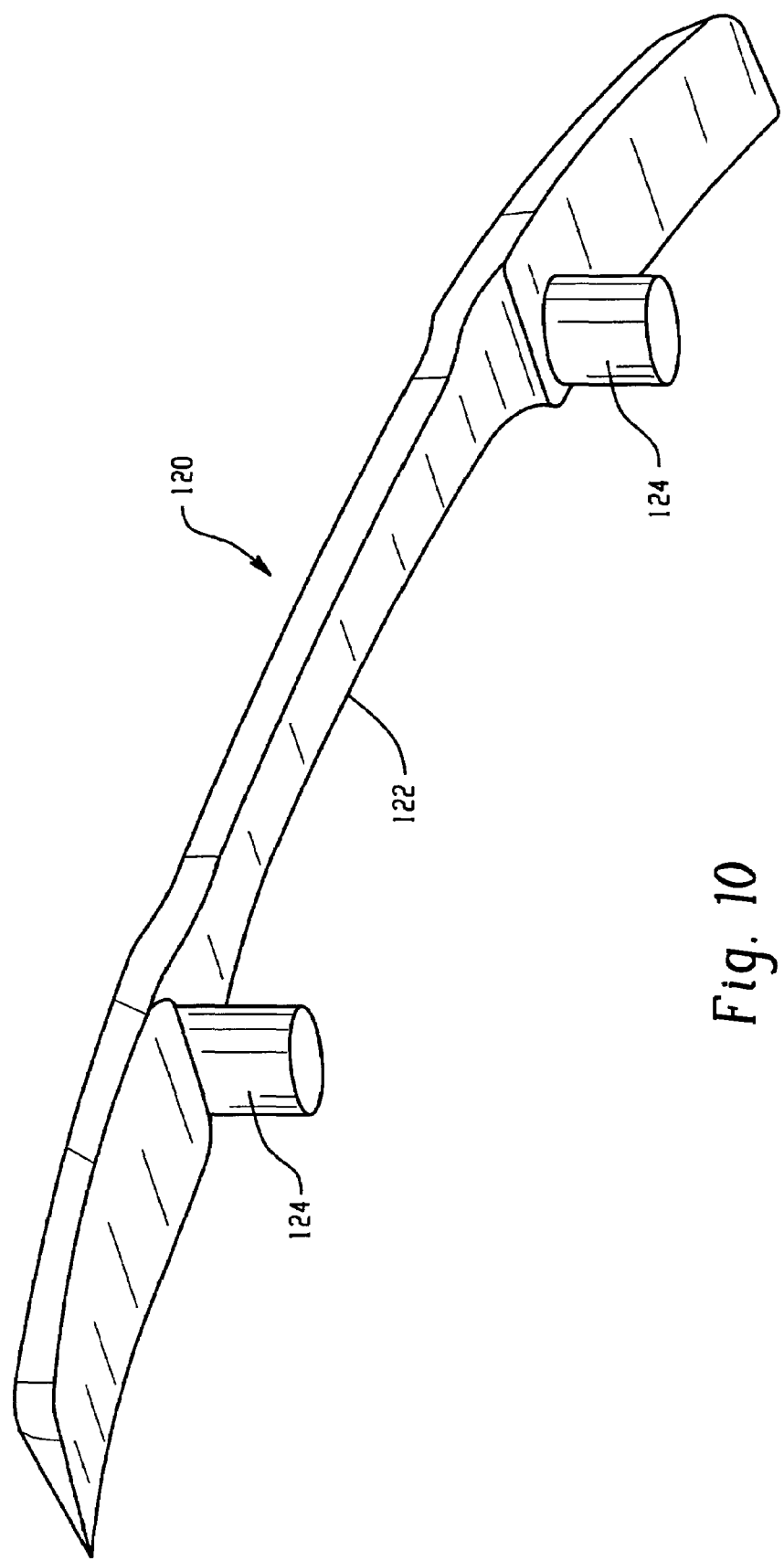
FIG. 10 illustrates a perspective view of a reversibly deployable spoiler that utilizes active material translatable posts in accordance with another embodiment.
Figure 11:
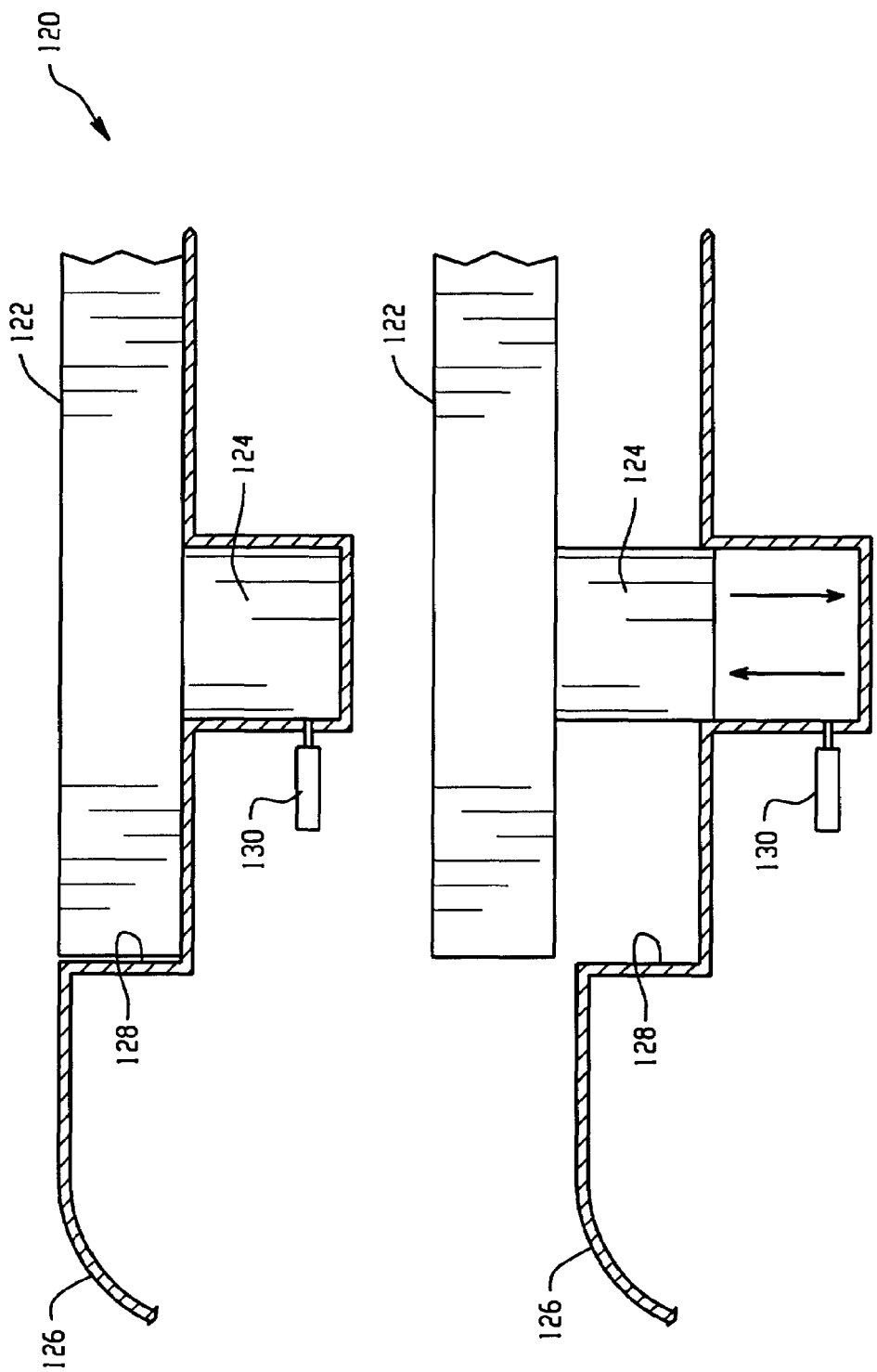
FIG. 11 is a sectional view of the reversibly deployable spoiler of FIG. 10.

In another embodiment, the spoiler defines a discrete body (i.e., airflow member) positioned on, positioned above, or positioned within a recess within the vehicle surface, that by its movement/repositioning with respect to the vehicle surface can increase or decrease airflow down force during movement of the vehicle. As shown in FIGS. 10 and 11, the spoiler 120 is illustrated utilizing active material translatable posts 122 upon which the air deflecting member 124 is seated.

The spoiler 120 includes a spoiler body 122 (i.e., airflow control member) seated onto at least one post 124 (two of which are shown in FIG. 10). The post is translatable with respect the vehicle body 126. By way of example, the post is disposed within a recess 128 formed in the vehicle body. However, it should be noted that the posts may be variously slidably engaged with slot opening in the airflow control member, the vehicle surface, or both and/or contain telescoping portions that can extend or shorten their height. An active material actuator similar to those discussed above comprising an active material is disposed in operative communication with the airflow control member to effect raising, lowering, and/or rotating of the airflow control member with respect to the vehicle surface. A latch 130 may be employed to lock the airflow member 122 at a desired position, e.g., in the fully deployed or retracted positions, which then permits deactivation of the active material while maintaining the position of the airflow control member.

FIG. 12 illustrates an exemplary active material actuator 140 that retracts the post 124 when the active material is activated. The post 124 is seated on a compression spring 142. An active material such as a shape memory alloy wire is anchored to the spoiler at one end 146 and to the vehicle 126 at another end 148. One or more pulleys 150 can be utilized to configure the active material actuator 140. The post 124 moves downward and is latched upon activation of the active material 144 as shown. Upon deactivation, the latch can be selectively unlatched causing the compression spring to decompress and deploy the post and airflow member 122 from the vehicle body. In the case of shape memory alloys, the wire would pseudoplastically deform.

FIG. 13 illustrates an exemplary active material actuator 160 that deploys the post when the active material is activated. In this embodiment, a compression spring 162 is biased such that the post 124 is in the retracted position when the active material (counterforce) is not activated. Upon activation of the active material 166, the post deploys from the vehicle body. Using shape memory alloys as an exemplary active material, one end of the SMA is anchored to the vehicle at anchor point 168 and at its other end to the post 124 at anchor point 170. Optionally, a pulley 164 can be employed. A latch 130 can be used to selectively maintain the spoiler in an "up" position even when the active material is deactivated. The latch can be integrated with the active material actuator (i.e., be active material actuated), mechanically actuated, hydraulically actuated, or pneumatically actuated as may be desired for different applications. In a preferred embodiment, the actuator wires are horizontally disposed within the length of the spoiler or within the vehicle body.

Active material includes those compositions that can exhibit a change in stiffness properties, shape and/or dimensions in response to the activation signal, which can take the type for different active materials, of electrical, magnetic, thermal and like fields. Preferred active materials include but are not limited to the class of shape memory materials, and combinations thereof. Shape memory materials generally refer to materials or compositions that have the ability to remember their original at least one attribute such as shape, which can subsequently be recalled by applying an external stimulus, as will be discussed in detail herein. As such, deformation from the original shape is a temporary condition. In this manner, shape memory materials can change to the trained shape in response to an activation signal.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 20° C. Another temperature for shape recovery may be greater than or equal to about 70° C. Another temperature for shape recovery may be less than or equal to about 250° C. Yet another temperature for shape recovery may be less than or equal to about 200° C. Finally, another temperature for shape recovery may be less than or equal to about 180° C.

Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). The polymer(s) used to form the various segments in the SMPs described above are either commercially available or can be synthesized using routine chemistry. Those of skill in the art can readily prepare the polymers using known chemistry and processing techniques without undue experimentation.

Similar to shape memory polymers, shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Active materials also include, but are not limited to, shape memory material such as magnetic materials and magnetorheological elastomers. Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper. Suitable MR elastomer materials have previously been described.

The spoilers and methods of the present disclosure are able to adjust features such as shape, dimension, stiffness, location, combinations thereof, and the like by changing the at least one attribute of active material to match the needs of different driving conditions. Changes in at least one attribute of active material include shape, dimension, stiffness, combinations thereof and the like. Utilizing active materials to affect these changes provide devices of increased simplicity and robustness, while reducing the number of failure modes, device volume and energy requirements for activation due to higher energy densities.

The active material may also comprise an electroactive polymer such as ionic polymer metal composites, conductive polymers, piezoelectric material and the like. As used herein, the term "piezoelectric" is used to describe a material that mechanically deforms when a voltage potential is applied, or conversely, generates an electrical charge when mechanically deformed.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity (for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, $AgCaSe_2$, ZnSe, GaP, InP, ZnS, and mixtures thereof.

Suitable active materials also comprise magnetorheological (MR) compositions, such as MR elastomers, which are known as "smart" materials whose rheological properties can rapidly change upon application of a magnetic field. MR elastomers are suspensions of micrometer-sized, magnetically polarizable particles in a thermoset elastic polymer or rubber. The stiffness of the elastomer structure is accomplished by changing the shear and compression/tension moduli by varying the strength of the applied magnetic field. The MR elastomers typically develop structure when exposed to a magnetic field in as little as a few milliseconds. Discontinuing the exposure of the MR elastomers to the magnetic field reverses the process and the elastomer returns to its lower modulus state.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A spoiler adapted for use with a vehicle, such that the spoiler defines a surface of the vehicle that can increase or decrease airflow downforce during movement of the vehicle, the spoiler comprising:

a housing having an opening;

an airflow control member translatably disposed within the housing and slidably engaged with the opening;

an actuator comprising an active material in operative communication with the member, operable to undergo a reversible change when exposed to or occluded from an activation signal, and configured to exert a translation force upon, so as to effect deployment or retraction of the member from or into the housing; and a biasing element disposed within the housing, and configured to exert a linear biasing force upon the member antagonistically to and less than the translation force.

2. The spoiler of claim 1, wherein the active material is selected from a group consisting of shape memory alloys, shape memory polymers, electroactive polymers, ferromagnetic shape memory alloys, electrorheological fluids, magnetorheological fluids, dielectric elastomers, ionic polymer metal composites, piezoelectric polymers, and piezoelectric ceramics.

3. The spoiler of claim 1, wherein the active material actuator comprises a shape memory alloy wire having one end linked to the airflow control member and a bias spring attached to the airflow control member configured to provide a counter force to that provided by the shape memory alloy wire.

4. The spoiler of claim 3, wherein the bias spring has a spring constant greater than the force exerted upon the member by the shape memory alloy wire when the shape memory alloy wire is in a martensite phase and less than the translation force.

5. The spoiler of claim 1, further comprising a flap seal disposed about the opening, the flap seal configured to prevent particulate matter from entering the housing.

6. The spoiler of claim 3, further comprising at least one pulley in operative communication with the shape memory alloy wire.

7. The spoiler of claim 3, wherein the housing comprises a top wall, a bottom wall and sidewalls extending therebetween, wherein the top wall comprises a bias spring retaining structure within the housing, wherein the airflow control member comprises a first portion in sliding engagement with the opening and a second portion with the bias spring intermediate the bias spring retaining structure and the second portion, and wherein the shape memory alloy wire is configured to contract and compress the bias spring upon activation and extend the first portion from the housing.

8. The spoiler of claim 7, wherein the bias spring is configured to expand and retract the first portion into the housing when the shape memory alloy wire is not activated.

9. The spoiler of claim 3, wherein the housing comprises a top wall, a bottom wall and sidewalls extending therebetween, wherein the airflow control member comprises a first portion in sliding engagement with the opening and a second portion with the bias spring intermediate the bottom wall and the second portion, and wherein the shape memory alloy wire is configured to contract and expand the bias spring upon activation and extend the first portion from the housing.

10. The spoiler of claim 9, wherein the bias spring is configured to compress and retract the first portion into the housing when the shape memory alloy wire is not activated.

11. The spoiler of claim 3, wherein the airflow control member has a substantially linear shape orientation that is in sliding engagement with the opening, wherein the bias spring is seated on a shoulder of the opening and is intermediate the airflow control member and the shoulder, and wherein the shape memory alloy wire is configured to contract and compress the bias spring upon activation and retract the airflow control member from the housing.

12. The spoiler of claim 11, wherein the bias spring is configured to expand and deploy the airflow control member from the housing when the shape memory alloy wire is not activated.

* * * * *